United States Patent
Hasegawa et al.

(10) Patent No.: US 11,593,389 B1
(45) Date of Patent: Feb. 28, 2023

(54) PRIORITIZED REPROCESSING OF CRAWLED FILES

(71) Applicant: International Business Machines Corporation, Armonk, NY (US)

(72) Inventors: Tohru Hasegawa, Tokyo (JP); Yansen Xu, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/449,099

(22) Filed: Sep. 28, 2021

(51) Int. Cl.
*G06F 16/2457* (2019.01)
*G06F 16/248* (2019.01)
*G06F 16/22* (2019.01)
*G06F 16/93* (2019.01)

(52) U.S. Cl.
CPC .... *G06F 16/24578* (2019.01); *G06F 16/2272* (2019.01); *G06F 16/248* (2019.01); *G06F 16/93* (2019.01)

(58) Field of Classification Search
CPC ............... G06F 16/24578; G06F 16/93; G06F 16/2272; G06F 16/248
See application file for complete search history.

(56) References Cited

U.S. PATENT DOCUMENTS

| | | | | |
|---|---|---|---|---|
| 7,769,742 B1* | 8/2010 | Brawer | ................. | G06F 16/951 707/709 |
| 9,015,167 B1* | 4/2015 | Ballou | ................. | G06F 16/2228 707/741 |
| 9,921,907 B2* | 3/2018 | Volvovski | ............. | G06F 3/0619 707/709 |
| 2007/0208716 A1 | 9/2007 | Krishnaprasad | | |
| 2008/0172390 A1* | 7/2008 | Zeller | ..................... | G06F 16/93 707/999.009 |
| 2009/0132516 A1 | 5/2009 | Patel | | |
| 2014/0188797 A1* | 7/2014 | Araki | ..................... | G06F 16/27 707/624 |
| 2015/0302098 A1* | 10/2015 | Hern | ........................ | G06F 21/41 707/708 |
| 2018/0101527 A1 | 4/2018 | Govindarajan | | |

OTHER PUBLICATIONS

"Rebuilding the index for InfoSphere Information Server clients", IBM, printed on Jul. 27, 2021, 8 pages, <https://www.ibm.com/support/knowledgecenter/SSZJPZ_11.7.0/com.ibm.swg.im.iis.found.admin.nav.doc/containers/t_reindex.html>.

Disclosed Anonymously, "System and Method for Optimizing Search on Enterprise Wikis", An IP.com Prior Art Database Technical Disclosure, IP.com No. IPCOM000224400D, IP.com Electronic Publication Date: Dec. 18, 2012, 13 pages.

\* cited by examiner

*Primary Examiner* — Yuk Ting Choi
(74) *Attorney, Agent, or Firm* — Stephen R. Yoder

(57) ABSTRACT

Prioritizing crawled data in a document store for reprocess operations. Reprocessing occurs upon a triggering change to configurations. Prioritization is based on the status of the crawled data with respect to an ACL. During reprocessing, the crawled data is reprocessed in an order defined by assigned priority levels.

12 Claims, 5 Drawing Sheets

… (1)

PRIORITIZED REPROCESSING OF CRAWLED FILES

BACKGROUND

The present invention relates generally to the field of enterprise computing systems, and more particularly to reprocessing of crawled files in a document store.

An enterprise search is a search for documents or data in enterprise computing systems. A general web search is different in that the enterprise search is capable of performing a single search for documents and/or files in different types of content management systems and file servers.

A document-oriented database, or document store, is a computer program and data storage system designed for storing, retrieving, and managing document-oriented information, also known as semi-structured data. Documents are addressed in a document store, via a unique key that represents that document. The unique key is a simple identifier such as a string, a uniform resource identifier (URI), or a path. The key can be used to retrieve the document from the store. The store usually retains an index on the key to speed up document retrieval.

When a configuration of a converter or enrichment program is changed, the crawled data stored in a source document store is selected by the converter during a reprocessing to update an index including links to the source documents. An example of a configuration change of the converter is a change to a setting for making specific annotations or a change to a setting to allow for use with OCR (optical character recognition). An example of a configuration change of an enrichment is an update of user-defined dictionaries.

An access control list (ACL) is a table that tells a computer operating system which access rights each user or group of users has to a particular system object, such as a file directory or individual file. Each object has a security property that connects it to its access control list. The list has an entry for every user with access rights to the system. Typical privileges include the right to read a single file (or all the files) in a directory and to execute or write to the file or files in a directory.

SUMMARY

In one aspect of the present invention, a method, a computer program product, and a system includes: (i) ingesting objects and related metadata from a data source server into a document-oriented database within an enterprise computing system; (ii) identifying priority objects within the ingested objects, the priority objects having access control lists; (iii) determining a user count representing the number of users in a first access control list for a first priority object; (iv) assigning a priority value to the first priority object, the priority value representing the number of users; (v) responsive to a search request for objects within the document-oriented database, causing reprocessing of a corresponding index to begin reprocessing in an order according to priority value of the objects by: (a) updating the index for stored priority objects including the first priority object; and (b) after updating the index for the stored priority objects, updating the index for remaining objects indexes; and (vi) returning a search result set including updated links to a set of priority objects.

In another aspect of the present invention, a method, a computer program product, and a system include reprocessing of the corresponding index being initiated when a configuration change is made to a converter to make specific annotations to objects when retrieved from the document-oriented database.

DETAILED DESCRIPTION

Figure 1:
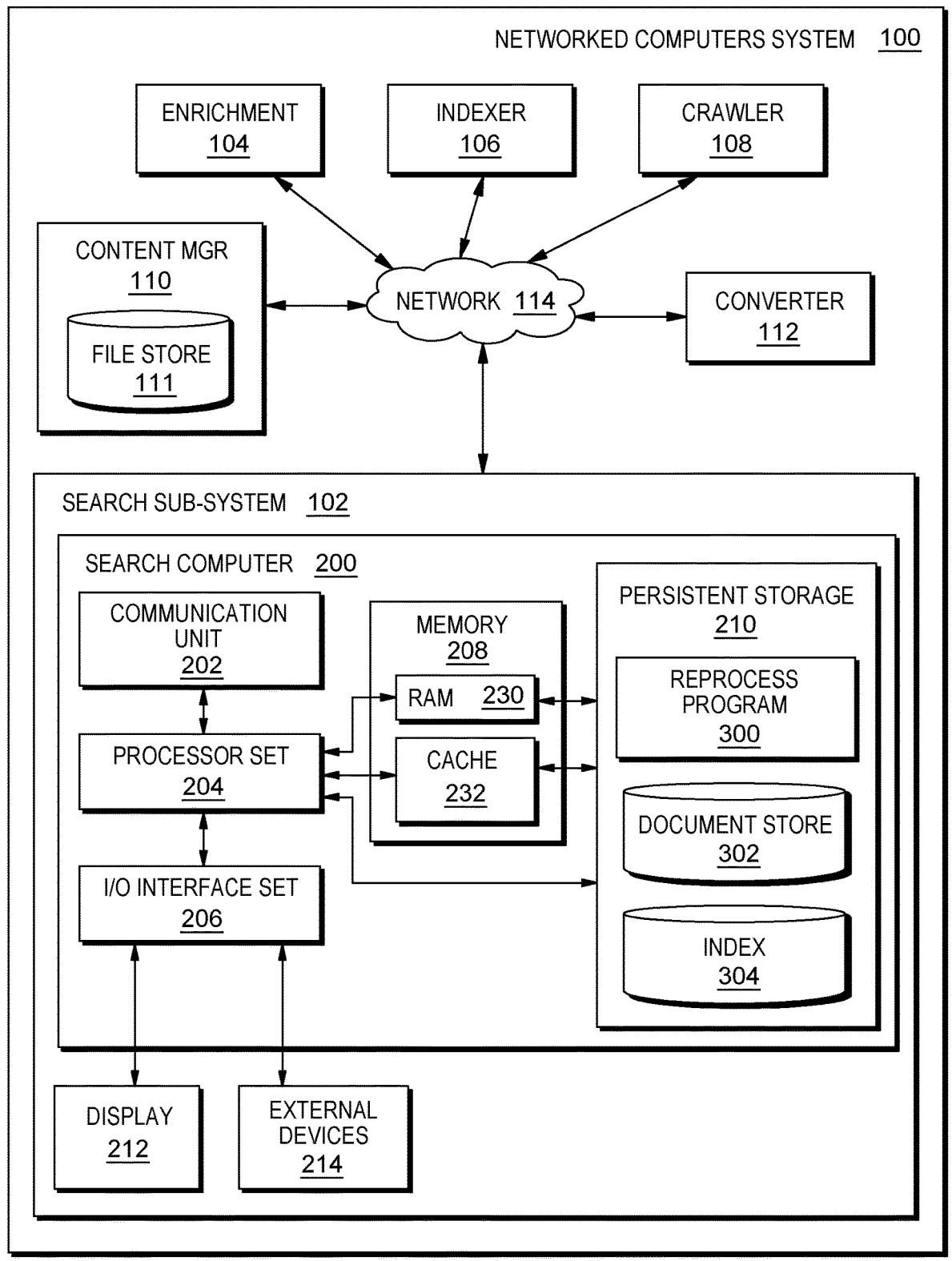
FIG. 1 is a schematic view of a first embodiment of a system according to the present invention.

Prioritizing crawled data in a document store for reprocess operations. Reprocessing occurs upon a triggering change to configurations. Prioritization is based on the status of the crawled data with respect to an ACL. During reprocessing, the crawled data is reprocessed in an order defined by assigned priority levels. The priority levels are assigned to the data when collected by the crawler for storage. The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium, or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network, and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture, including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present invention will now be described in detail with reference to the Figures. FIG. 1 is a functional block diagram illustrating various portions of networked computers system 100, in accordance with one embodiment of the present invention, including: search sub-system 102; enrichment sub-system 104; indexer sub-system 106; crawler sub-system 108; converter sub-system 110; client sub-system 112; communication network 114; search computer 200; communication unit 202; processor set 204; input/output (I/O) interface set 206; memory device 208; persistent storage device 210; display device 212; external device set 214; random access memory (RAM) devices 230; cache memory device 232; reprocessing program 300; document store 302; and index 304.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage, and control certain software functions that will be discussed in detail below.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware component within a system. For example, the communications fabric can be implemented, at least in part, with one or more buses.

Memory 208 and persistent storage 210 are computer readable storage media. In general, memory 208 can include any suitable volatile or non-volatile computer readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions, and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either, or both, physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with computer 200. For example, I/O interface set 206 provides a connection to external device set 214. External device set 214 will typically include devices such as a keyboard, keypad, a touch screen, and/or some other suitable input device. External device set 214 can also include portable computer readable storage media such as, for example, thumb drives, portable optical or magnetic disks, and memory cards. Software and data used to practice embodiments of the present invention, for example, program 300, can be stored on such portable computer readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the present invention. However, it should be appreciated that any particular program nomenclature herein is used merely for convenience, and thus the present invention should not be limited to use solely in any specific application identified and/or implied by such nomenclature.

Reprocessing program 300 operates to prioritize crawled data in a document store for reprocess operations. Reprocessing occurs upon a triggering change to configurations. Prioritization is based on the status of the crawled data with respect to an access control list (ACL). During reprocessing, the crawled data is reprocessed in an order defined by assigned priority levels. The priority levels are assigned to the data when collected by the crawler for storage.

Oftentimes crawled data processed in an old configuration and crawled data processed in an updated configuration become mixed when the data is output from a document store as enterprise search results. The mixing would remain until all the crawled data can be reprocessed according to the updated configuration. To resolve this problem, when storing crawled data in a source document store, a crawler will also store a priority value based on an access control list (ACL). When reprocessing crawled data, the converter is able to pick up the crawled data in decreasing order of priority.

Some embodiments of the present invention recognize the following facts, potential problems and/or potential areas for improvement with respect to the current state of the art: (i) enterprise search has a function of displaying, as search results, only search data accessible to search users based on access control lists (ACLs) of data source servers; (ii) if a large number of files are stored in the source doc store, it takes a long time to complete reprocessing; and (iii) if a search server is not stopped during reprocessing, crawled data processed in an old setting, or configuration, and crawled data processed in an updated setting, or configuration, may be mixed and output as search results until all crawled data are reprocessed.

Some embodiments of the present invention are directed to a process including the following steps: (i) extend a source document store to be able to store priority values for stored documents; (ii) a crawler checks the ACL when storing crawled data; (iii) if the ACL contains a group, contact a server that manages the group such as a lightweight directory access protocol (LDAP), and identify users who belong to the group; (iv) store, in the source document store, the specified users who can access the file as a priority; and (v) a converter checks the priority when picking up data from the source document store, picking up the data in decreasing order of priority.

Some embodiments of the present invention are directed to determining document priority within a document store where high priority is established when the ACL contains a specific user or user group. For example, when checking operations after a setting change occurs, a system management department is unable to check operations until after all the processing of changes is completed. According to some embodiments of the present invention, a high priority may be established for the operations when the corresponding ACL contains a user group for the system management department. In that way, the delay is reduced when checking operations by a user who belongs to the group associated with the system management department.

Figure 2:
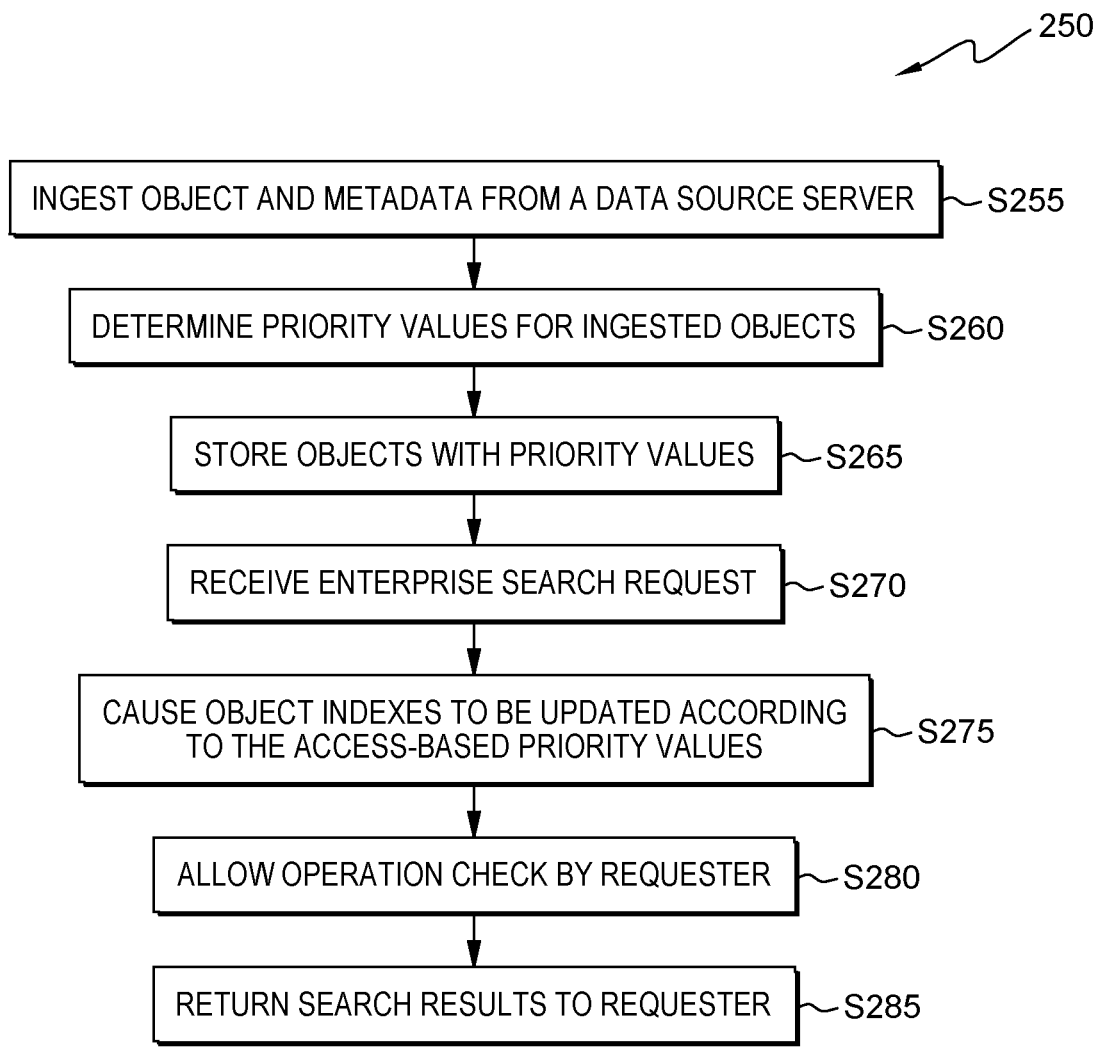
FIG. 2 is a flowchart showing a method performed, at least in part, by the first embodiment system.
Figure 3:
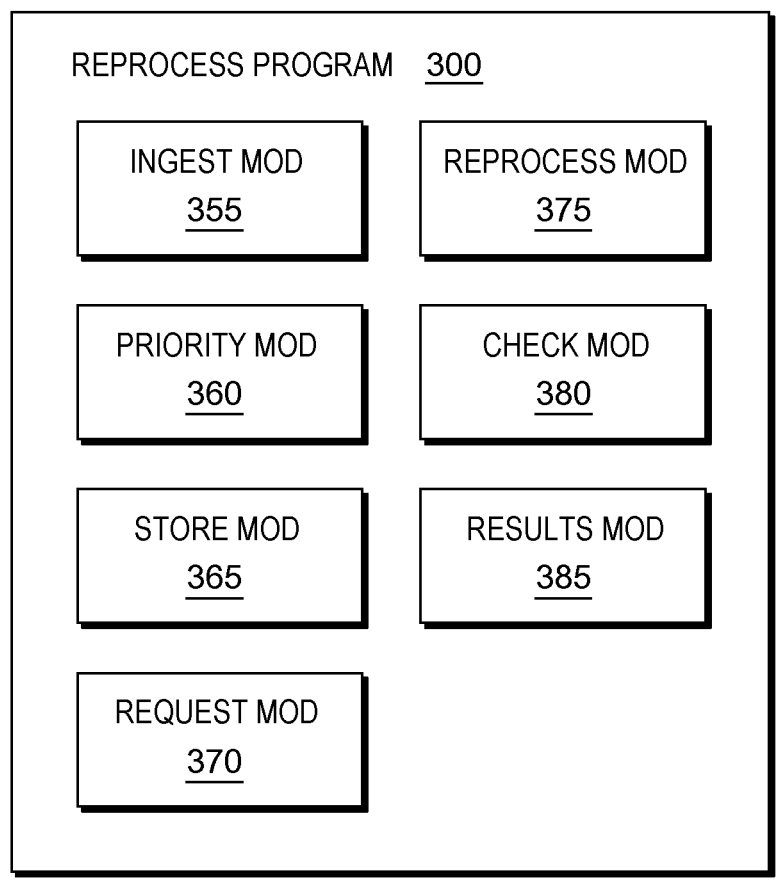
FIG. 3 is a schematic view of a machine logic (for example, software) portion of the first embodiment system.

FIG. 2 shows flowchart 250 depicting a first method according to the present invention. FIG. 3 shows program 300 for performing at least some of the method steps of flowchart 250. This method and associated software will now be discussed, over the course of the following paragraphs, with extensive reference to FIG. 2 (for the method step blocks) and FIG. 3 (for the software blocks).

Processing begins at step S255, where ingest module ("mod") 355 ingests objects and metadata from a data source server. In this example, objects are ingested from file store 111 in content manager 110 (FIG. 1). The objects are any objects that may have an access control list such as a document, text file, or image file.

Processing proceeds to step S260, where priority mod 360 determines priority values for ingested objects. The priority values are based on information provided by ACLs associated with the ingested objects. In this example, for each user identified in the ACL, one point is assigned to the priority. Users may be identified as being part of an identified group in the ACL. Where a group is considered for priority value, contact is made with the server of the identified group so that a count of the number of users in the group can be obtained. For each user in the group an additional point is added to the priority value. Alternatively, a default number is assigned to the various groups of an organization so when a particular group is in the ACL, then the pre-defined priority number is added to the priority value. Alternatively, all groups have a same priority value adder for determining a final priority value. For example, if three users are explicitly placed on the ACL and two groups are in the ACL, the priority value would be a single user priority value multiplied by three plus a group priority value multiplied by two. If single users are assigned a value of one and the groups are assigned a value of 10, the priority value for the example is 23.

Processing proceeds to step S265, where store mod 365 stores objects with priority values. In this example, the object and priority values are stored in document store 302 (FIG. 1). Objects are stored with associated priority scores for later reference when a search is performed from an index corresponding to the document store. The document store, in this example, is a document-oriented database having a reference index, such as index 304 (FIG. 1). According to some embodiments of the present invention, the index is searched for documents within the source document store such that search results include links to identified documents in the document store.

Processing proceeds to step S270, where request mod 370 receives an enterprise search request for documents identified in a document store index. When a user requests for a search of object within the enterprise system, the results are provided through an index for documents located in various storage device and managed by various content managers within the enterprise.

Processing proceeds to step S275, where reprocess mod 375 causes objects indexes to be updated according to the access-based priority values. The priority values calculated at step S260 are driven by access details such as those found in access control lists. Oftentimes, configurations for modules are changed in an enterprise system. When a configuration change effects a converter or enrichment for objects, the index must be updated.

To expedite indexing operations known as reprocessing, the order in which objects are reprocessed in the index is based on the assigned priority value. In that way, objects of interest to the requesting user may be processed ahead of objects less likely of interest to the user. In this example, the highest value priority object is reprocessed first with the remaining objects being address be order of reducing priority values.

Processing proceeds to step S280, where check mod 380 allows an early operation check in advance of the return of search results. In this example, the requester is allowed to perform an operation check during the indexing process, thus accelerating access to the user over conventional processes that do not allow operation checks until all documents are updated via the reprocessing operation.

Processing proceeds to step S285, where results mod 385 returns search results to the requester. As stated herein, the order of the search results is not intentionally changed, but the order in which relevant objects are updated prior to returning them as search results is governed by embodiments of the present invention.

Further embodiments of the present invention are discussed in the paragraphs that follow and later with reference to FIGS. 4 and 5.

Some embodiments of the present invention are directed to determining a priority level of a file while being picked up by the converter in cases when the contents of a group are often changed.

Some embodiments of the present invention are directed to technology for determining the order to pick up files for indexing based on ACLs rather than arranging search results in order of priority based on ACLs.

Some embodiments of the present invention are directed to a process for applying access control lists for files to prioritized reindexing prior to responding to a search request. The process including: (i) determining a priority level of files to be searched in a document store based on access control list (ACL) for the files; and (ii) when reindexing for a search request, reindexing the files according to an order of the determined priority. According to some embodiments of the present invention, the priority level is determined based on the number of users permitted to access the files by the ACL. Further, according to some embodiments of the present invention, the priority is determined based on a group permitted to access the files by the ACLs.

Some embodiments of the present invention are directed to a prioritized order for reprocessing crawled files in an enterprise search system.

Some embodiments of the present invention are directed to determining a priority level for files in a document store to be reprocessed due to a configuration change, the priority levels based on access control lists (ACL) of the files. According to some embodiments, the priority level for files is determined according to the number of users permitted by the ACLs to access the files. Further, some embodiments of the present invention establish a priority level for files where a group of users is permitted by the ACLs to access the files.

Information obtained for a file when it is crawled includes various attributes including identifying metadata, timestamp, and access information found in the ACL. An example of source document data is shown in Table 1.

TABLE 1

| Example of Source Document Data. | |
|---|---|
| ID | 1 |
| METADATA | filename, filesize, . . . etc. |
| CONTENT | xxxxxxxx |
| CRAWLED TIME | 2020-11-23 01-19 03:14:07 |
| PRIORITY | 150 |

Some embodiments of the present invention are directed to a technique to prioritize the files to be indexed according to the ACLs for the files.

The present invention will now be described in detail with reference to FIGS. 4 and 5. FIG. 4 is a functional block diagram illustrating various portions of distributed enterprise computers system 400, in accordance with an embodiment of the present invention, including: data source server sub-system 402; enterprise search sub-system 404; search server sub-system 406; index 408; crawler module 410; converter module 412; enrichment module 414; indexer module 416; source document store 418; and requester sub-system 420. FIG. 4 shows distributed enterprise computers system 400 for performing at least some of the method steps of flowchart 500. According to some embodiments of the present invention, distributed enterprise computers system 400 is a system that stores documents and files in content management systems, such as content manager sub-system 110 (FIG. 1), and file servers to be searched.

Figure 4:
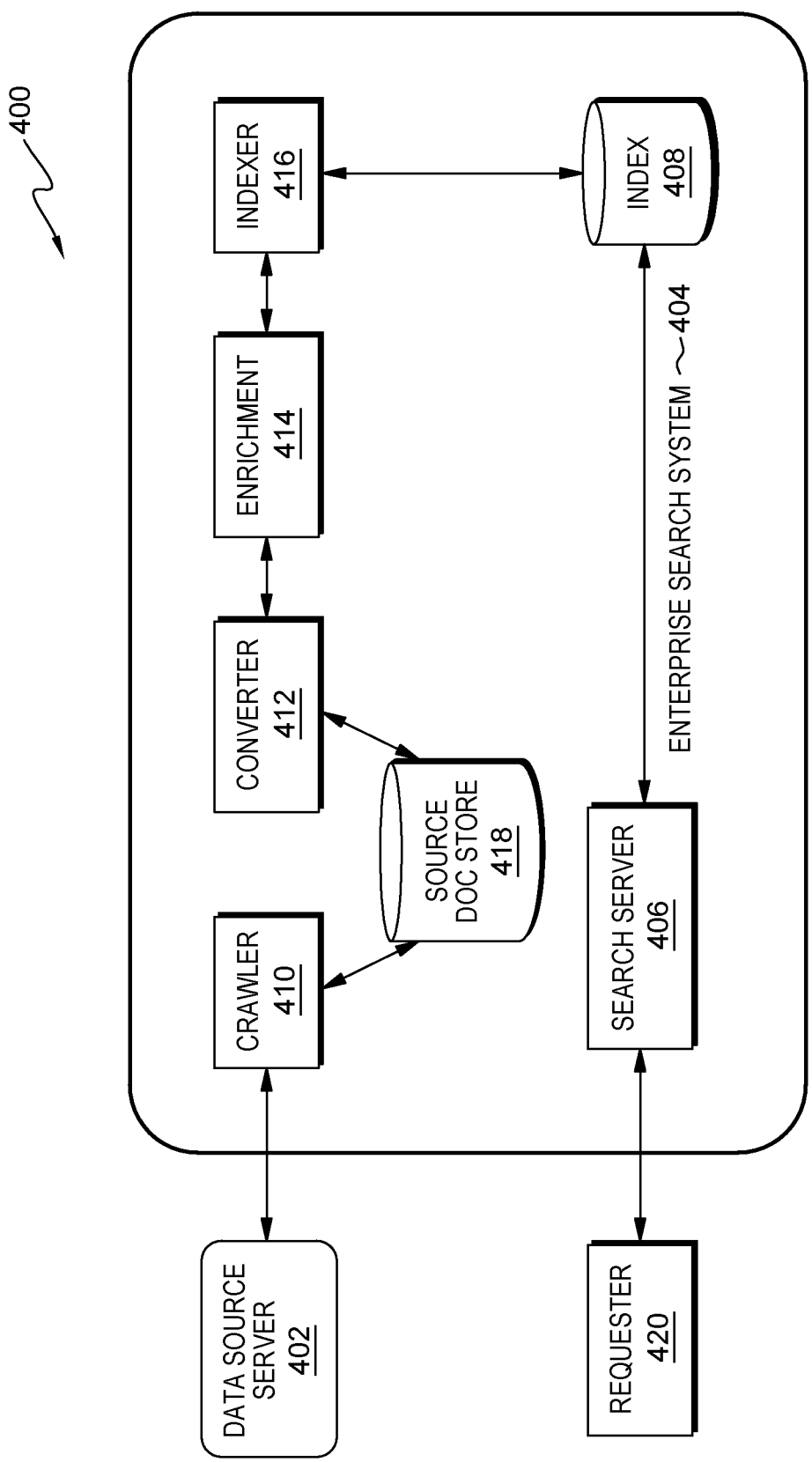
FIG. 4 is a schematic view of a second embodiment of a system according to the present invention.
Figure 5:
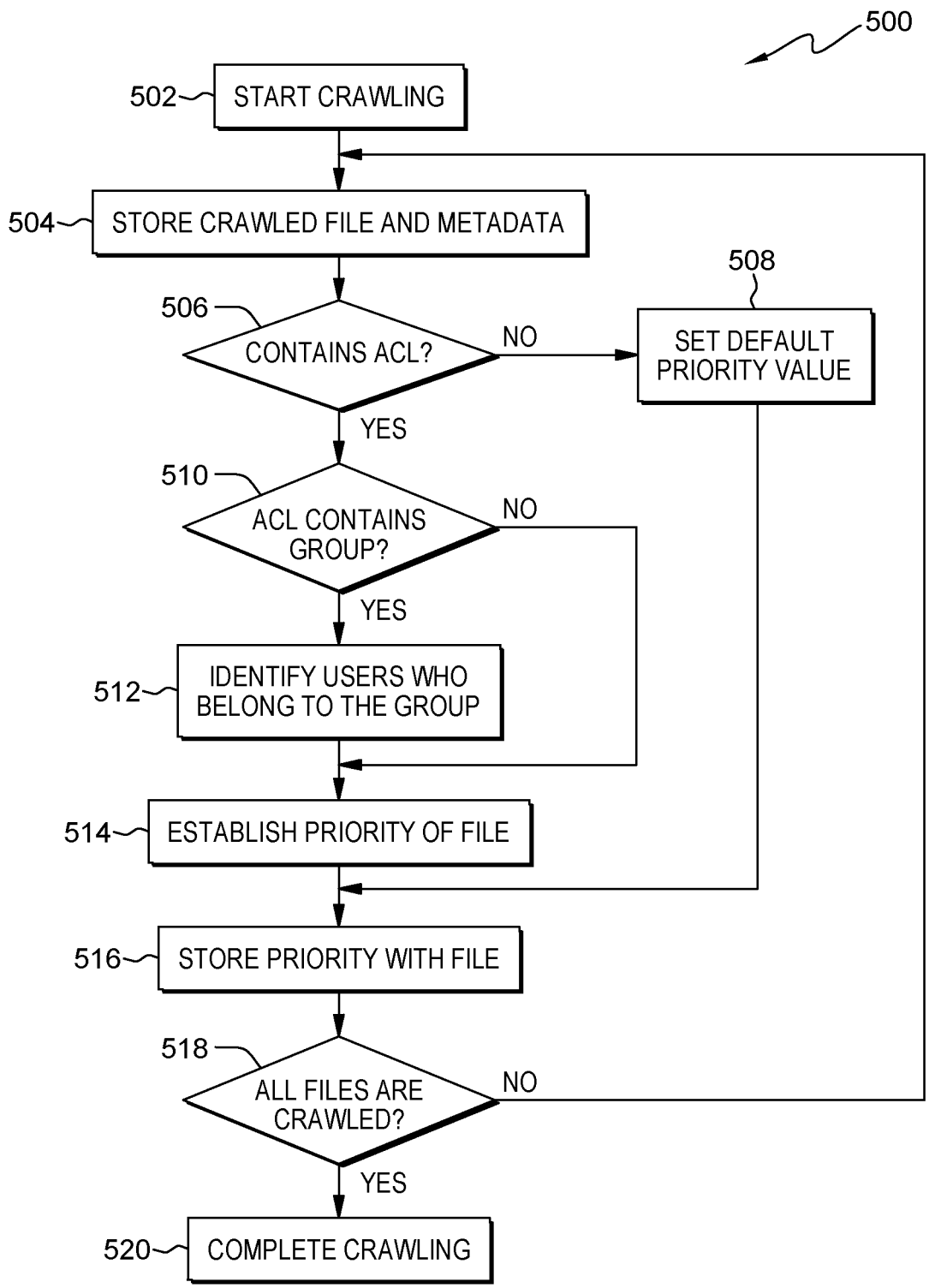
FIG. 5 is a flowchart showing a method performed, at least in part, by the second embodiment system.

FIG. 5 shows flowchart 500, which illustrates a second method according to an embodiment of the present invention. This method and associated software will now be discussed, over the course of the following paragraphs, with extensive reference to FIG. 4 (for the computing system) and FIG. 5 (for the method step blocks).

Processing begins at step 502, where crawler module ("mod") 410 starts crawling an enterprise system for objects including files and/or documents. In this example, the crawler mod is a software module that accesses a data source server to ingest documents and/or files. In particular, it also ingests access information such as access-control list (ACL) information as one of the metadata items.

Processing proceeds to step 504, where the crawler mod 410 stores the crawled objects including collected metadata. In this example, the crawler stores the objects and related metadata in source document store 418. The source document store is a storage location that stores crawled documents and files. Further, in this example, crawled data includes documents and files stored in source document store 418.

Processing proceeds to decision step 506, where a decision is made as to whether or not the stored object contains ACL information. If the stored object does not contain ACL information, processing follows the "NO" branch to step 508, where a default priority value is assigned to the object. If the stored object contains ACL information, processing follows the "YES" branch to decision step 510.

Following the "YES" branch, processing proceeds to decision step 510, where a decision is made as to whether or not the ACL contains a group. If the ACL does not contain a group, processing follows the "NO" branch to step 514. If the ACL does contain a group, processing follows the "YES" branch to step 512, where further processing occurs related to the group contained in the ACL.

Following the "YES" branch, processing proceeds to step 512, where users who belong to the group contained in the ACL are identified at least by a count. According to some embodiments of the present invention, the priority level is determined based on the number of users permitted to access the files by the ACL. In this example, where the ACL contains a group, contact is made with a server that manages the particular group such as a lightweight directory access protocol (LDAP) to identify users who belong to the group. The users are identified by count for determining a priority value for the object.

Processing proceeds to step 514, where a priority value is established for the crawled object. In this example, the priority value is the sum of all users having access to the object. The sum includes individual users contained in the ACL as well as the count of users associated with any groups contained in the ACL.

Processing proceeds to step 516, where the object is stored in a source document store with the assigned priority value. Storing the object with the assigned priority value supports later access by an enterprise search engine via index 408.

Processing proceeds to decision step 518, where it is determined whether or not there are other crawled objects to be processed by deciding if all objects are crawled. If not all of the available objects have been crawled, processing follows the "NO" branch returning to step 504. If all of the available objects have been crawled, processing follows the "YES" branch to step 520, where crawling is completed, and the process ends.

Referring to FIG. 4, according to some embodiments of the present invention converter mod 412 is a software module that extracts text data or metadata such as file type contained in documents and files. Enrichment mod 414 is a software module that analyzes text data or metadata and adds information such as part of speech of a word or sentiment in the document of file. Indexer mod 416 is a software module that creates an index to facilitate a search of information added by the enrichment. Search server 406 includes software that answers a search request from a user with reference to index 408, which stores information in an easy-to-search manner.

It is recognized that in certain situations, the process described herein does not produce search results faster than conventional methods. That is, crawled data that has not been completely reprocessed may be mixed in the returned search results before a lapse of sufficient time after the start of reprocessing. When that is the case, a longer delay than would otherwise be experienced is necessary. However, the same delay is experienced when practicing the conventional art where crawled data are reprocessed in the order in which they are crawled. Accordingly, some embodiments of the present invention do not worsen the conventional timing during worst case scenarios.

Experimental data follows where conventional processing is used and compared to processing time when performed according to order of priority instead of order of receipt of change. A conventional ingestion of 2,036 PDF files was performed. The setting of the converter was changed to make specific annotations and the files were reprocessed under conventional processing where order of receipt was applied. The time to actual appearance of the annotations in the search result was observed and recorded. PDF files having annotations began to appear in the search result at 15 minutes from start of reprocessing. Approximately 100 files contained annotations at 20 minutes from start of reprocessing. A continued increase in files in the search result having annotations until 100% was reached at 36 minutes from the start of reprocessing. When processing of files was performed by priority according to an access control list (ACL) in the order of highest priority, the observed processing times were approximately 50% faster than when using a conventional approach. Further, the operation check was able to be performed sooner when setting high priority files based on the ACL of the user group "system management department."

Some embodiments of the present invention may include one, or more, of the following features, characteristics and/or advantages: (i) by prioritizing the files based on an access control list (ACL), many people can see the updates in a short period when the re-index operation is performed; (ii) crawled data with a high priority rating can be processed early and added promptly to the index regardless of the order in which they are crawled; and (iii) setting a high priority to crawled data that many users can access allows users to obtain requested search results in a relatively short time when the converter or the enrichment within the enterprise search system is changed.

Some helpful definitions follow:

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

User/subscriber: includes, but is not necessarily limited to, the following: (i) a single individual human; (ii) an artificial intelligence entity with sufficient intelligence to act as a user or subscriber; and/or (iii) a group of related users or subscribers.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A method comprising:
    storing crawled data into a document-oriented database within an enterprise computing system, the document-oriented database including a set of existing objects and related metadata;
    identifying priority objects within the crawled data, the priority objects being a sub-set of the crawled data under access control by access control lists;
    determining a user count representing a number of users in a first access control list for a first priority object of the sub-set of the crawled data;
    assigning a first priority value to the first priority object, the first priority value based on the user count;
    changing a configuration of a data converter for processing an index of objects stored in the document-oriented database, the updating establishing an updated converter;
    responsive to the configuration change, reprocessing, by the updated converter, the index of stored objects by a decreasing order of the assigned priority values, including the first priority value.

2. The method of claim 1, further comprising:
    receiving a search request from an authorized user for objects within the document-oriented database, the search request received during the reprocessing of the index; and
    allowing an operation check by the authorized user prior to completing the reprocessing by displaying a current search result set with updated links while reprocessing lower-priority data;
    wherein:
    the current search result set includes only objects processed in an updated converter.

3. The method of claim 1, wherein the reprocessing includes:
    updating the index for stored priority objects including the first priority object; and
    after updating the index for the stored priority objects, updating the index for remaining objects.

4. The method of claim 1, wherein the configuration change is made to the data converter to make specific annotations to the stored objects when retrieved from the document-oriented database.

5. A computer program product comprising a computer-readable storage medium having a set of instructions stored therein which, when executed by a processor, causes the processor to perform a method comprising:
    storing crawled data into a document-oriented database within an enterprise computing system, the document-oriented database including a set of existing objects and related metadata;
    identifying priority objects within the crawled data, the priority objects being a sub-set of the crawled data under access control by access control lists;
    determining a user count representing a number of users in a first access control list for a first priority object of the sub-set of the crawled data;
    assigning a priority value to the first priority object, the first priority value based on the user count;
    changing a configuration of a data converter for processing an index of objects stored in the document-oriented database, the updating establishing an updated converter; and
    responsive to the configuration change, reprocessing, by the updated converter, the index of stored objects by a decreasing order of the assigned priority values, including the first priority value.

6. The computer program product of claim 5, further comprising:
    receiving a search request from an authorized user for objects within the document-oriented database, the search request received during the reprocessing of the index; and
    allowing an operation check by the authorized user prior to completing the reprocessing by displaying a current search result set with updated links while reprocessing lower-priority data;
    wherein:
    the current search result set includes only objects processed in an updated converter.

7. The computer program product of claim 5, wherein the reprocessing includes:
    updating the index for stored priority objects including the first priority object; and after updating the index for the stored priority objects, updating the index for remaining objects.

8. The computer program product of claim 5, wherein the configuration change is made to the data converter to make specific annotations to the stored objects when retrieved from the document-oriented database.

9. A computer system comprising:

a processor set; and a computer readable storage medium;

wherein:

the processor set is structured, located, connected, and/or programmed to run program instructions stored on the computer readable storage medium; and the program instructions which, when executed by the processor set, cause the processor set to perform a method comprising:

storing crawled data into a document-oriented database within an enterprise computing system, the document-oriented database including a set of existing objects and related metadata;

identifying priority objects within the crawled data, the priority objects being a sub-set of the crawled data under access control by access control lists;

determining a user count representing a number of users in a first access control list for a first priority object of the sub-set of the crawled data;

assigning a priority value to the first priority object, the first priority value based on the user count;

changing a configuration of a data converter for processing an index of objects stored in the document-oriented database, the updating establishing an updated converter; and responsive to the configuration change, reprocessing, by the updated converter, the index of stored objects by a decreasing order of the assigned priority values, including the first priority value.

10. The computer system of claim 9, further comprising:

receiving a search request from an authorized user for objects within the document-oriented database, the search request received during the reprocessing of the index; and allowing an operation check by the authorized user prior to completing the reprocessing by displaying a current search result set with updated links while reprocessing lower-priority data;

wherein:

the current search result set includes only objects processed in an updated converter.

11. The computer system of claim 9, wherein the reprocessing includes:

updating the index for stored priority objects including the first priority object; and after updating the index for the stored priority objects, updating the index for remaining objects.

12. The computer system of claim 9, wherein the configuration change is made to the data converter to make specific annotations to the stored objects when retrieved from the document-oriented database.

* * * * *